United States Patent
Ikeda

[11] Patent Number: 5,963,271
[45] Date of Patent: Oct. 5, 1999

[54] IMAGE PROCESSING APPARATUS AND METHOD WITH APERTURE CORRECTION

[75] Inventor: Eiichiro Ikeda, Kawasaki, Japan

[73] Assignee: Canon Kabushkik Kaisha, Tokyo, Japan

[21] Appl. No.: 08/790,437

[22] Filed: Jan. 29, 1997

[30] Foreign Application Priority Data

Jan. 31, 1996 [JP] Japan ................................. 8-016075

[51] Int. Cl.$^6$ ................................................. H04N 5/208
[52] U.S. Cl. .................... 348/625; 348/607; 348/252; 348/687; 382/261; 382/263
[58] Field of Search ............................. 348/607, 252, 348/199, 625, 628, 629, 630, 631, 687, 627, 616, 618; 382/260, 261, 263, 266, 269, 274, 167; 358/532; H04N 5/208

[56] References Cited

U.S. PATENT DOCUMENTS

| | | | |
|---|---|---|---|
| 3,783,190 | 1/1974 | Gaebele | 348/627 |
| 3,789,133 | 1/1974 | Kline | 348/627 |
| 4,394,688 | 7/1983 | Iida et al. | 358/160 |
| 4,969,051 | 11/1990 | Sasaki | 358/447 |
| 4,970,593 | 11/1990 | Cantrell | 358/166 |
| 5,291,288 | 3/1994 | Masuda | 348/252 |
| 5,418,574 | 5/1995 | Miyabata et al. | 348/625 |
| 5,534,916 | 7/1996 | Sakaguchi | 348/252 |
| 5,537,154 | 7/1996 | Ahn | 348/629 |
| 5,574,513 | 11/1996 | Topper | 348/652 |
| 5,581,306 | 12/1996 | Ohara | 348/625 |
| 5,668,606 | 9/1997 | Okamoto et al. | 348/625 |
| 5,696,850 | 12/1997 | Parulski et al. | 382/261 |
| 5,696,852 | 12/1997 | Minoura et al. | 382/266 |
| 5,745,609 | 4/1998 | Nelson et al. | 348/618 |
| 5,748,258 | 5/1998 | Tanji | 348/625 |
| 5,757,977 | 5/1998 | Mancuso et al. | 382/260 |
| 5,771,318 | 6/1998 | Fang et al. | 382/261 |
| 5,777,689 | 7/1998 | Dunbar | 348/625 |
| 5,787,209 | 7/1998 | Konstantinides et al. | 382/260 |
| 5,799,112 | 8/1998 | De Queiroz et al. | 382/263 |

*Primary Examiner*—Michael H. Lee
*Assistant Examiner*—Jean W. Désir
*Attorney, Agent, or Firm*—Fitzpatrick Cella Harper & Scinto

[57] ABSTRACT

An image processing apparatus and method wherein the apparatus has an input unit for inputting input image information of image data and output device information of an output device which outputs the image data and an image processing unit for subjecting the image data to an aperture correction process in accordance with the input image information and output device information.

9 Claims, 12 Drawing Sheets

FIG. 5

| Device_Name | ELECTRONIC CAMERA |
|---|---|
| General Info. | |
| save_form | tiff |
| x_size | 800 |
| y_size | 600 |
| range | |
| red | 8 |
| green | 8 |
| blue | 8 |
| magenta | — |
| cyan | — |
| yellow | — |
| black | — |
| gamma_curve | table |
| user_definition_space | |
| Unique_Info. | case1 |
| data_type | nature |
| apc_on | off |
| object_of_apc | |
| monitor | — |
| lcd | — |
| first printer | — |
| second printer | |
| user_definition_space | |

| | case2 |
|---|---|
| Unique_Info. | |
| data_type | nature |
| apc_on | on |
| object_of_apc | |
| monitor | 0 |
| lcd | 0 |
| first printer | +2 |
| second printer | −2 |
| user_definition_space | |
| if apc_on == on | |
| Filter | |
| dimension | 1 |
| h_tap_number | 3 |
| v_tap_number | 3 |
| h_coefficient | |
| h0 | −1 |
| h1 | 2 |
| v_coefficient | |
| v0 | −1 |
| v1 | 2 |
| Base_Clip | |
| h_base_clip | 0 |
| v_base_clip | 0 |
| Gain_Correct | |
| h_apc_gain | 1 |
| v_apc_gain | 1 |
| apc_gain | 1 |

FIG. 6A

| Device_Name | FIRST MONITOR |
|---|---|
| APC. info. | |
| nature picture<br>Digital Filter A | |
|   dimension | 1 |
|   h_tap_number | 5 |
|   v_tap_number | 3 |
|   h_coefficient | |
|     h0 | −1 |
|     h1 | −2 |
|     h2 | 6 |
|   v_coefficient | |
|     v0 | −1 |
|     v1 | 2 |
| Base_Clip | |
|   h_base_clip | 16 |
|   v_base_clip | 16 |
| Gain_Correct | |
|   h_apc_gain | 1 |
|   v_apc_gain | 0.5 |
|   apc_gain | table |
|   amplitude_suppress | table |
|   chroma_suppress | table |
|   darkness_suppress | table |
| user_definition_space | |
| Digital Filter B  letter | |
|   dimension | 1 |
|   h_tap_number | 9 |
|   v_tap_number | 9 |
|   h_coefficient | |
|     h0 | 0 |
|     h1 | 3 |
|     h2 | 0 |
|     h3 | −28 |
|     h4 | 50 |
|   v_coefficient | |
|     v0 | 0 |
|     v1 | 3 |
|     v2 | 0 |
|     v3 | −28 |
|     v4 | 50 |

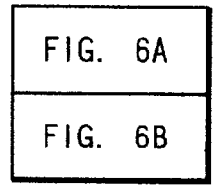

FIG. 6B

FROM FIG. 6A

| | |
|---|---|
| Base_Clip<br>  h_base_clip<br>  v_base_clip | 15<br>15 |
| Gain_Correct<br>  h_apc_gain<br>  v_apc_gain<br>  apc_gain<br>  amplitude_suppress<br>  chroma_suppress<br>  darkess_suppress | 0.5<br>1<br>table<br>table<br>none<br>none |
| Digital Filter C  normal | |
| dimension<br>h_tap_number<br>v_tap_number<br>h_coefficient<br>    h0<br>    h1<br>v_coefficient<br>    v0<br>    v1 | 1<br>3<br>3<br><br>−1<br>−2<br><br>−1<br>−2 |
| Base_Clip<br>  h_base_clip<br>  v_base_clip | 5<br>5 |
| Gain_Correct<br>  h_apc_gain<br>  v_apc_gain<br>  apc_gain<br>  amplitude_suppress<br>  chroma_suppress<br>  darkness_suppress | 1<br>1<br>table<br>table<br>none<br>none |
| Grad. info. | |
| output_bit<br>red<br>blue<br>magenta<br>cyan<br>yellow<br>black<br>gamma_curve | 8<br>8<br>8<br>none<br>none<br>none<br>none<br>table | ent resolution senses.
IMAGE PROCESSING APPARATUS AND METHOD WITH APERTURE CORRECTION

BACKGROUND OF THE INVENTION

1. Field of the Invention

The present invention relates to an image processing apparatus and method for aperture correction.

2. Related Background Art

Digital image input apparatuses are now rapidly prevailing, including a scanner, an electronic camera, a video camera, a photo CD, and the like. DTP (Desktop Publishing) is therefore widely used for processing and editing images on a computer and outputting the images on a display or a printer.

A user displays image data taken with an electronic camera or the like on a display of a computer to edit it and print out. In such a case, color management systems (CMS) have been used conventionally.

The color management system (CMS) ensures color matching between different output media. "Color Sink" by Macintosh, "Color Sense" by Kodak, and the like are currently known which realize color matching to some degree.

These conventional techniques realize color matching between different output devices. However, matching between image sharpness, i.e., how images are viewed, is not realized.

For example, even if an image on a monitor has an optimum resolution sense (contour and dynamic range), a printed-out image often becomes a very vague image.

This is because a monitor and a printer have very different resolutions and dynamic ranges. In order to match resolution senses, it is therefore necessary to perform pixel interpolation and dynamic range correction. Furthermore, even if output devices have the same resolution, for example, since a monitor and a printer use different luminescent substances and light reflection substances, there is a problem of different resolution senses.

In order to avoid these problems, a user is required to have some experiences, and conventionally each user has performed image processing such as contour emphasis and gradation conversion, by using image editing tools.

Different aperture corrections and gradation conversions have been carried out in some cases between different output devices. Format and system have not been proposed as yet which, like CMS, automatically perform such corrections and gradation conversions without imposing a load on a user.

SUMMARY OF THE INVENTION

It is an object of the present invention to solve the above problems and allows any output device to output a high quality image without imposing a load on a user.

According to one aspect of the present invention, there is provided an image processing apparatus comprising: input means for inputting input image information of image data and output device information of an output device which outputs the image data; and image processing means for subjecting the image data to an aperture correction process in accordance with the input image information and output device information.

According to another aspect of the present invention, there is provided an image processing apparatus comprising: input means for inputting first aperture correction information corresponding to image data and second aperture correction information corresponding to an output device; and setting means for setting an aperture correction condition in accordance with the first and second aperture correction information.

The above and other objects and advantages of the present invention will become apparent from the following detailed description of preferred embodiments when read in conjunction with the accompanying drawings.

BRIEF DESCRIPTION OF THE DRAWINGS

FIG. 5 is a diagram showing input image information of an electronic camera;

FIG. 6 is comprised of FIGS. 6A and 6B illustrating diagrams showing output device information of a first monitor;

DETAILED DESCRIPTION OF THE PREFERRED EMBODIMENTS

Embodiments of an image processing apparatus of this invention will be described with reference to the accompanying drawings.

(First Embodiment)

Figure 1:
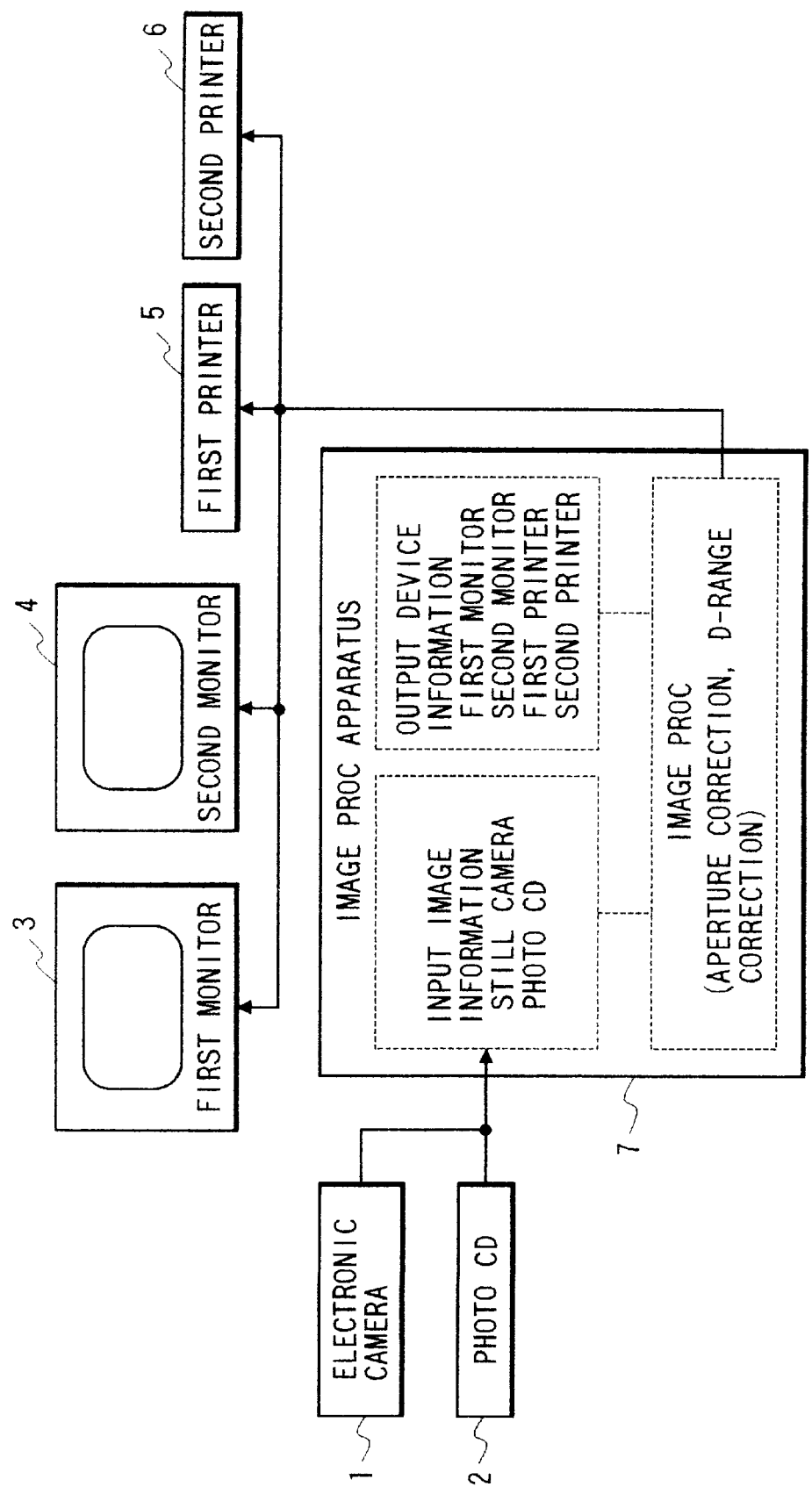
FIG. 1 is a block diagram showing the structure of an image processing system according to a first embodiment of the invention.

FIG. 1 is a block diagram showing an outline of an image processing system using an image processing apparatus of this invention. The image processing system shown in FIG. 1 is constituted of an electronic camera 1, a photo CD 2, a first monitor 3, a second monitor 4, a first printer 5, a second printer 6, and a computer 7.

In this structure, the electronic camera 1 and photo CD 2 are used as an image input device. The Photo CD is a compact disk CD storing digitalized images of photographs taken by using a film (negative/positive). The first and second monitors 3 and 4 and first and second printers 5 and 6 are used as an image output device.

Figure 2:
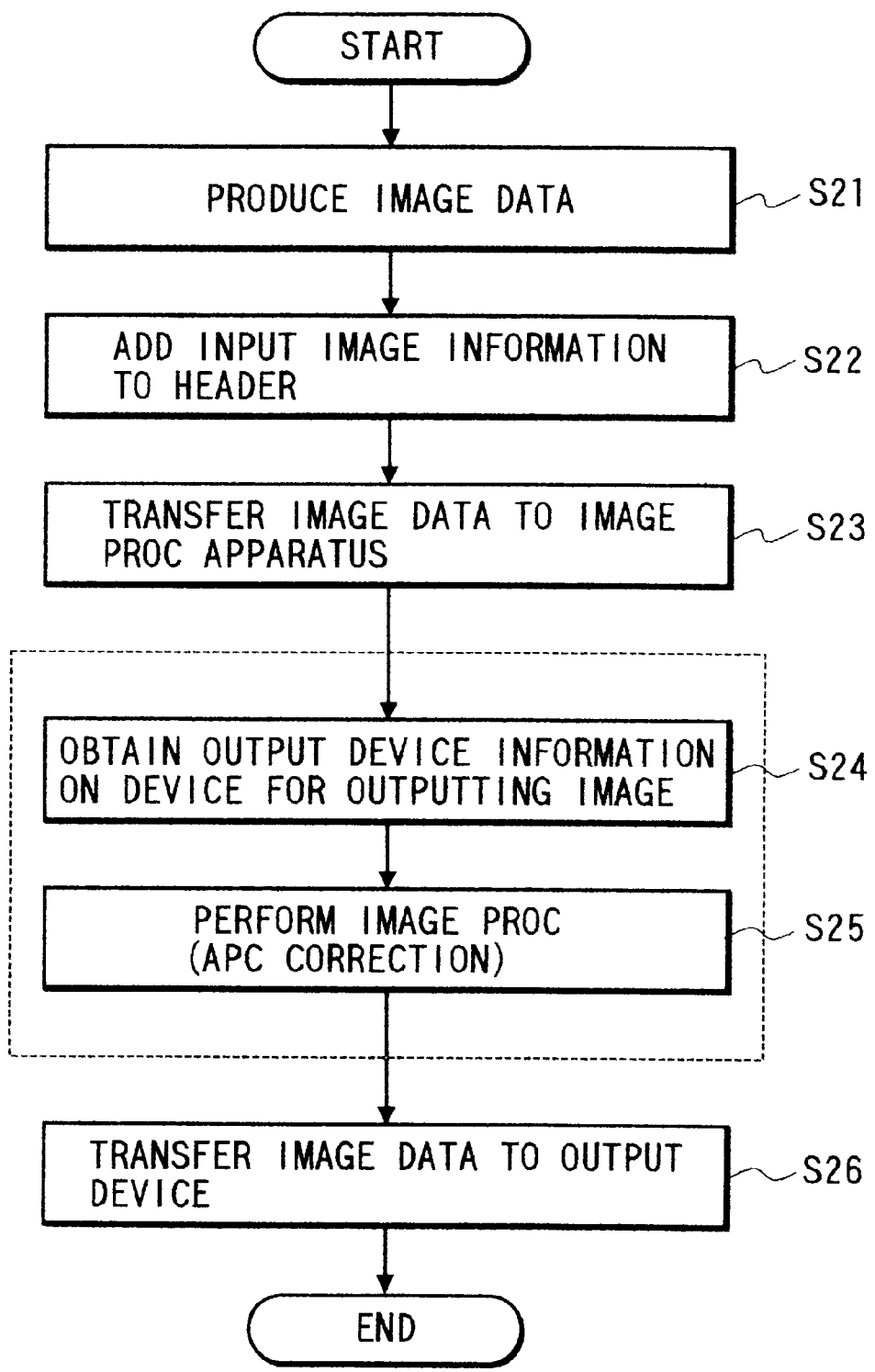
FIG. 2 is a flow chart illustrating an operation sequence of the image processing system of the first embodiment.
Figure 3:
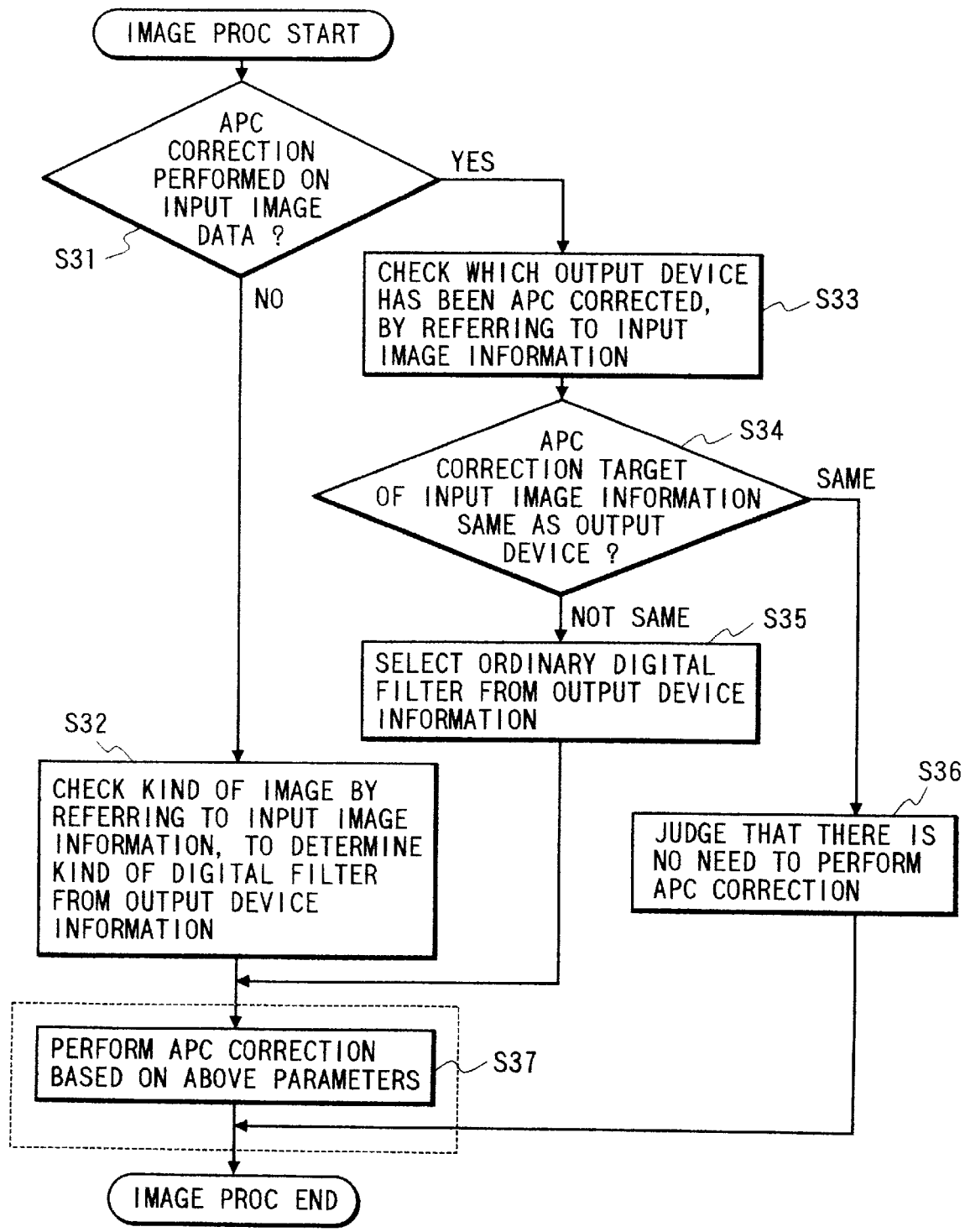
FIG. 3 is a flow chart illustrating another operation sequence of the image processing system of the first embodiment.
Figure 4:
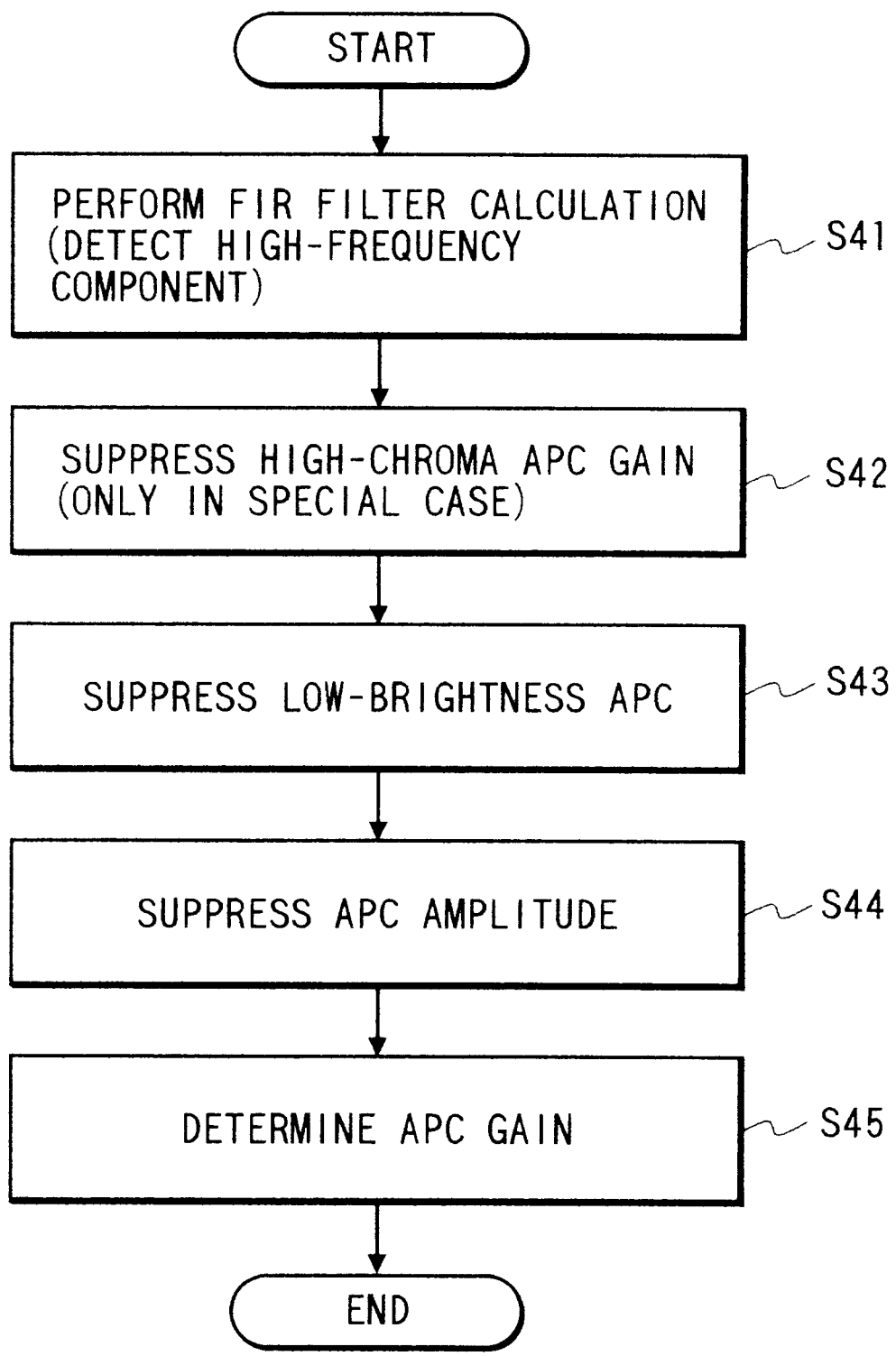
FIG. 4 is a flow chart illustrating another operation sequence of the image processing system of the first embodiment.

FIGS. 2 to 4 are flow charts illustrating operation sequences of the image processing system of this embodiment. The operation of the image processing system of this embodiment will be described with reference to FIGS. 1 to 4.

As shown in the flow chart of FIG. 2, an image signal generated when the electronic camera 1 takes some image is converted in the camera into image data of a general format such as TIFF, BMP, and RAW data (Step S21).

At Step S22, input image information is added as a header of the image signal. At Step S23, the image data added with the input image information is transferred to the image processing apparatus. Next, the image processing apparatus acquires output device information of a target output device from a plurality of prepared output device information sets (Step S24).

By using the acquired output information and the input image information added as the header to the image data, APC correction is executed in order to obtain an optimum image signal from the target output device (Step S25).

If a color management system (CMS) is being installed, a profile for realizing color matching between different devices is read to change color. In this embodiment, a combination of the input image information or output device information and the profile of CMS may be used.

The operation of CMS is not relevant to the embodiment, and so the description thereof is omitted. Next, at Step S26, the image data subjected to APC correction is transferred to the output device.

Next, the configuration of the input image information and output device information and the APC correction operation using these information will be detailed.

FIG. 5 shows the input image information of the electronic camera 1. The contents of the input image information will be described one item after another. General Information includes an image save_form, an x_size, a y_size, a range, a gamma curve, a user_definition_space a user can add later, and the like.

Unique Information includes an apc_on which describes whether APC is in use, an object_of_apc which describes for what output device APC was performed, a user_definition_space a user can add later, and the like.

FIGS. 6A and 6B show the output device information of the first monitor 3. Information described in this output device information includes a filter dimension for a digital filter A, an h_ or v_tap_number, and an h_ or v_coefficient of filer, respectively as APC information.

The information further includes an h_ or v_base clip value necessary for a base clip process of removing noises, an h_ or v_apc_gain for designating a gain correct in the horizontal/vertical direction, an apc_gain table and an amplitude_suppress table for changing an APC gain in accordance with the resolutions of input and output images, and the like.

A plurality of chroma_suppress tables and darkness_suppress tables are also described for each type of input images. The chroma_suppress table is used for suppressing pseudo signals generated at a color edge portion of a high chromatic pixel of image data taken with a still camera having a single plate such as an electronic camera. The darkness_suppress table is used for suppressing an emphasis of luminance noises in a darkness area.

APC correction will be described with reference to FIGS. 3, 5, 6A and 6B. By referring to the apc_on in the unique information of the input image information added as the header to the image data, it is checked whether APC correction has been performed on the input image data (Step S31).

If performed, at Step S32 the type of the input image is checked by referring to the data_type of the unique information, and a digital filter matching the type of the input image is selected from the output device information (APC Information) of output devices.

For example, referring to FIGS. 6A and 6B, if the input image is a nature picture, a digital filter A is selected. Next, at Step S37 APC correction is performed by using parameters of this filter.

If it is judged at Step S31 that APC correction has been performed on the input image data, it is checked at Step S33, by referring to the object_of_apc of the unique information, as to for which output device proper the APC correction has been performed.

As in the case 2 of the unique information shown in FIG. 5, the object_of_apc describes to what degree APC correction is performed for each output device. In this example, a monitor and an LCD are assigned "0". This means that the monitor and LCD are not necessary to perform APC correction and that the image data has been subjected to APC correction for the monitor and LCD.

In accordance with this parameter, if the image data is to be output from the first printer 5, the APC gain is set large (parameter indicates a degree of difference of gain from a normal APC gain), whereas if the image data is to be output from the second printer 6, unsharp correction is performed.

The information of APC correction given to the input image is obtained from the input image information in the above manner, and it is checked from the obtained information whether the APC correction target of the input image information is the same as the output device (Step S34). If not, at Step S35 a digital filter for normal use is selected from the output device information. Next, at Step S37 APC correction is performed by using the above parameters and the value of the object_of_apc of the input image information.

If it is judged at Step S34 that the APC correction target of the input image information is the same as the output device, at Step S36 it is judged that APC correction is not necessary, and the image is directly output.

Next, the APC correction operation to be executed at Step S37 will be described with reference to the flow chart shown in FIG. 4.

First, at Step S41 an FIR filter calculation is performed by selecting parameters of the digital filters in accordance with the input image information and output device information, in order to detect high frequency components of the image data.

Figure 7A:
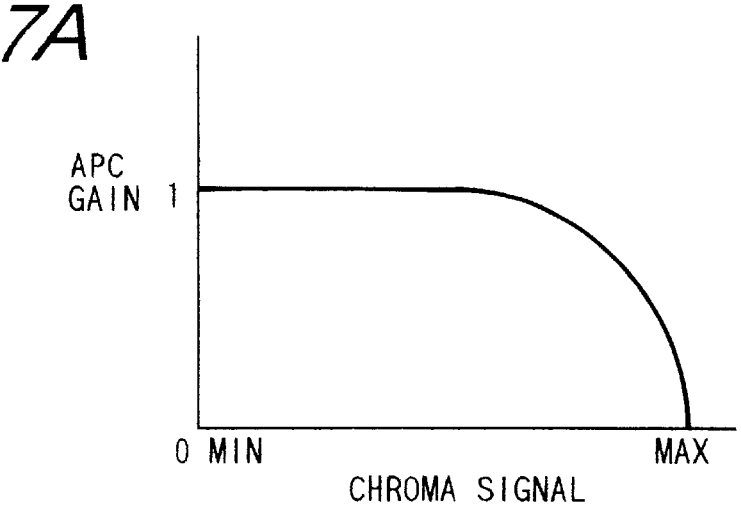
FIGS. 7A, 7B and 7C illustrate the contents of tables used for APC correction.

Next, if high-chroma APC gain suppression is to be performed, at Step S42 APC correction is suppressed at the edge area of high chromatic pixels, by using a chroma suppress table shown in FIG. 7A.

Figure 7B:
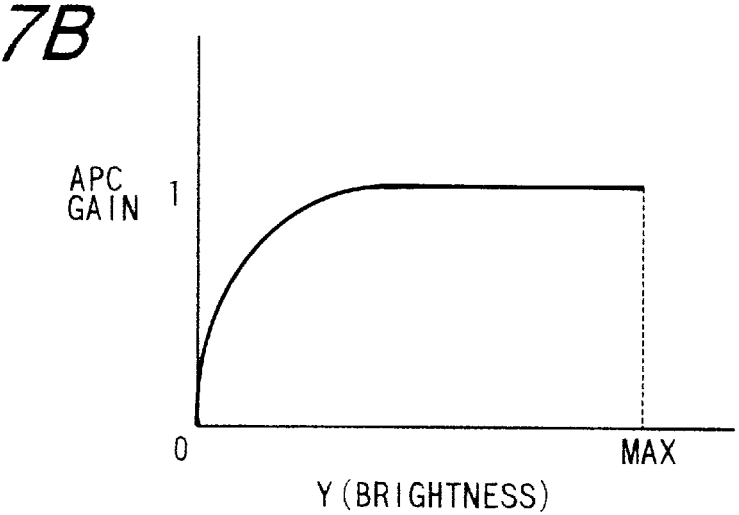

Next, at Step S43 an emphasis of noises is suppressed by using a darkness suppress table shown in FIG. 7B.

Figure 7C:
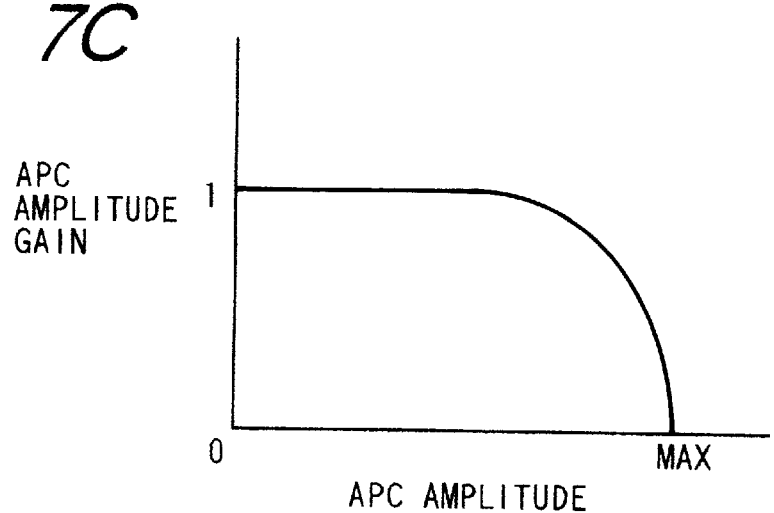

Next, at Step S44 an unnecessary expansion of an APC amplitude is suppressed by using an APC amplitude table shown in FIG. 7C.

Then, the APC gain is determined at Step S45 from the resolutions of input and output images and the apc_gain table to adjust the input image data.

As above, the input image information is added to the input image data, and the image processing apparatus 7 is provided with the output device information of each output device connected thereto. It is therefore possible to automatically perform APC correction of the input image so as to match the characteristics of an output device, by using the input image information and output device information. An image subjected to optimum APC correction can be output to any type of output devices, without imposing any load on a user.

The output device information may be received from an output device via a communication line via which APC corrected image data is supplied to the output device.

(Second Embodiment)

Figure 8:
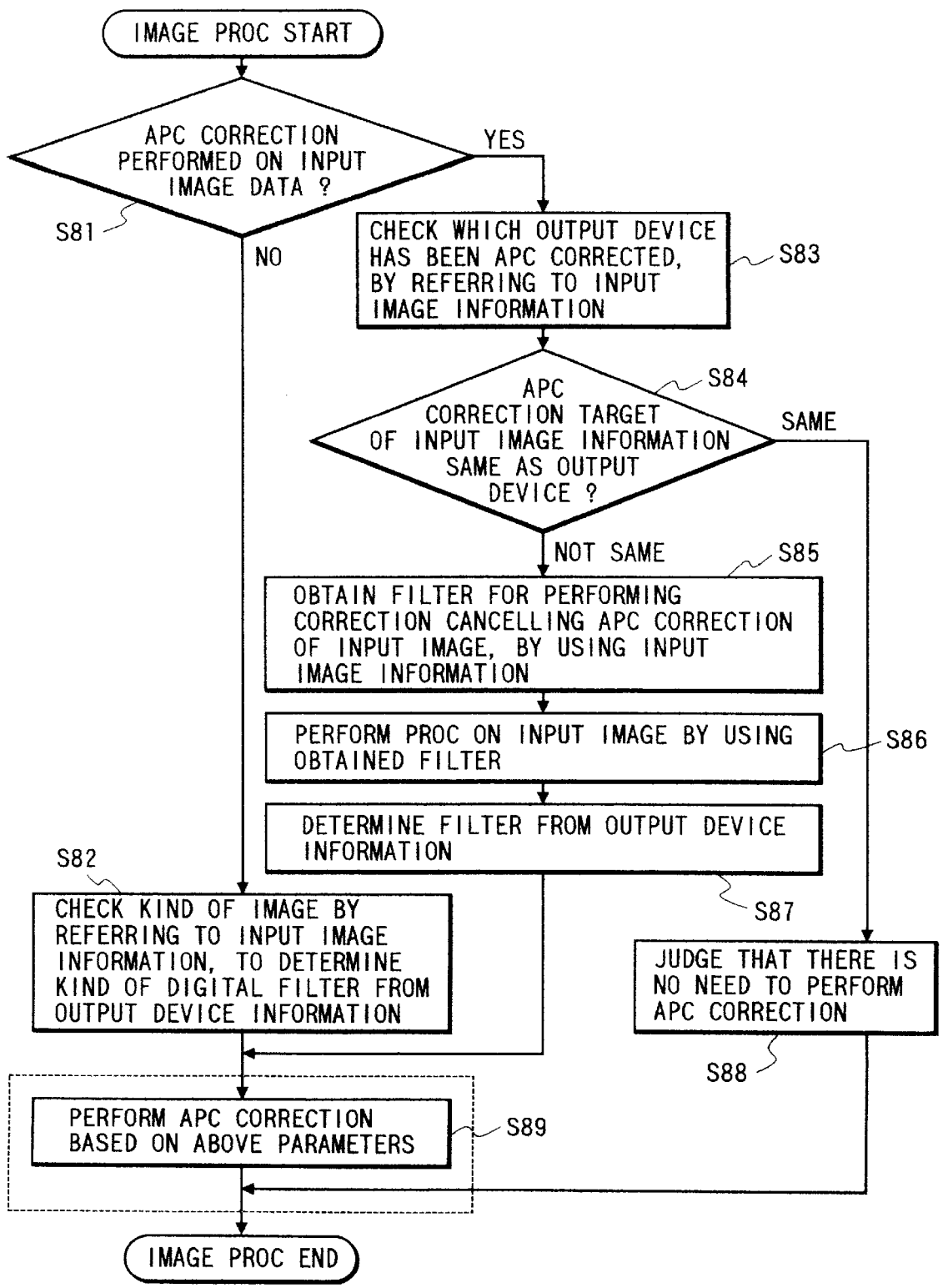
FIG. 8 is a flow chart illustrating an operation sequence of an image processing system according to a second embodiment.

FIG. 8 is a flow chart illustrating operation sequences of an image processing apparatus according to the second embodiment of the invention. In this embodiment, if an input image has been subjected to APC correction, this APC correction of the input image is once cancelled through filtering to obtain a device-independent image which is free from the APC correction by the input device, and thereafter, an optimum APC correction is performed at the output device. This point is different from the first embodiment. Namely, Steps S85 to S87 in the flow chart shown in FIG. 8 are different from the flow chart shown in FIG. 3.

Referring to FIG. 8, it is checked from the input image information whether APC correction has been performed on image data (Step S81). If not, the process same as Step S32 of the first embodiment is performed (Step S82) and APC correction is performed on the input image to output it (Step S89).

If APC correction has been performed, at Step S83 it is checked at Step S83 for which output device the APC correction has been performed and it is checked at Step S84 whether the APC correction target of the input image information is the same as the output device. If the same at Step S84, the input image is directly output without any APC correction (Step S88).

If the output device is not the APC correction target, APC parameters used for APC correction are acquired from the input image information (Step S85), and the input image is processed by filtering to cancel APC correction (Step S86) to obtain image data without APC correction.

Thereafter, a filter is determined by acquiring optimum parameters from the output device information (Step S87), and APC correction is performed on the image data to output it (Step S89). In this embodiment, therefore, an APC corrected image is once changed to a device-independent image without any APC correction, and this image is subjected to an optimum APC correction matching an output device.

Figure 9A:
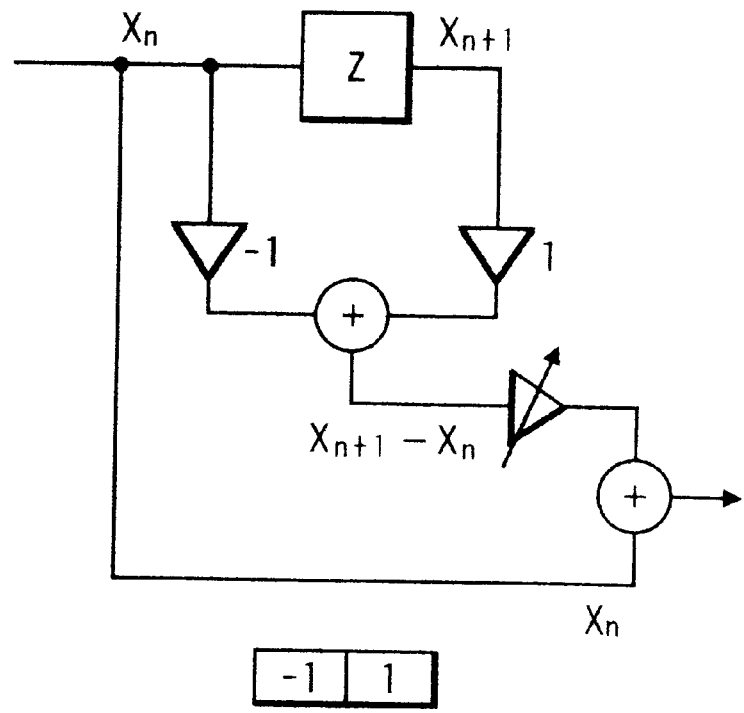
FIGS. 9A and 9B are block diagrams of digital filters.

A method of determining a filter for changing an APC corrected image to a device-independent image without any APC correction, will be described. It is assumed that an image has been subjected to filtering by a filter shown in FIG. 9A. By representing an input by Xn and an output by Yn, the output Yn can be given by:

$$Yn = Xn + k(Xn+1 - Xn) \quad (1)$$
$$= (1-k)Xn + nXn + 1$$

This equation is X-transformed, then it stands:

$$Y(z) = (1-k)X(z) + kX(z) \quad (2)$$
$$= [(1-k) + kZ]X(z)$$

The transfer function is given by:

$$H(z) = (1-k) + kZ \quad (3)$$

In order to cancel APC correction, an inverse filter of the equation (3) is used. This transfer function is given by:

$$H(z) = 1/\{(1-k) + kZ\} \quad (4)$$
$$= 1/[(1-k)\{1 + k/(1-k)Z\}]$$

Figure 9B:
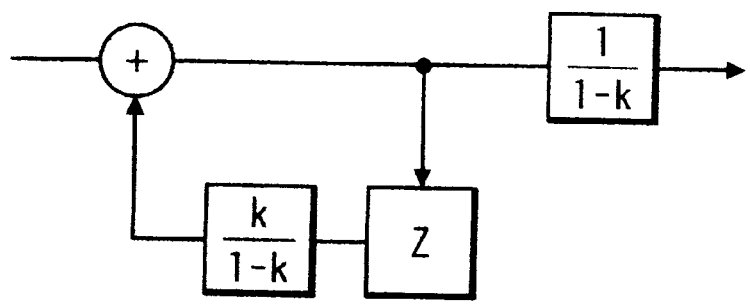

This filter is a cyclic filter shown in FIG. 9B. If an APC corrected input image is passed through this filter, an image without any APC correction can be generated. Instead of this filter, an FIR filter simulating this may be used to improve the operation stability.

With the above structure, an input image is added with the input image information, and the image processing apparatus 7 is provided with the output device information of an output device connected thereto. If an input image has been subjected to APC correction, APC correction information is acquired from the input image information.

The APC corrected image is passed through a filter having the inverse characteristics of APC correction to change it once to an image without any APC correction. Thereafter, by using the output device information, the device-independent image is subjected to APC correction matching the characteristics of a target output device to output it. An image subjected to optimum APC correction can therefore be output to any type of output devices irrespective of the type of input image, without imposing any load on a user.

(Third Embodiment)

Figure 10:
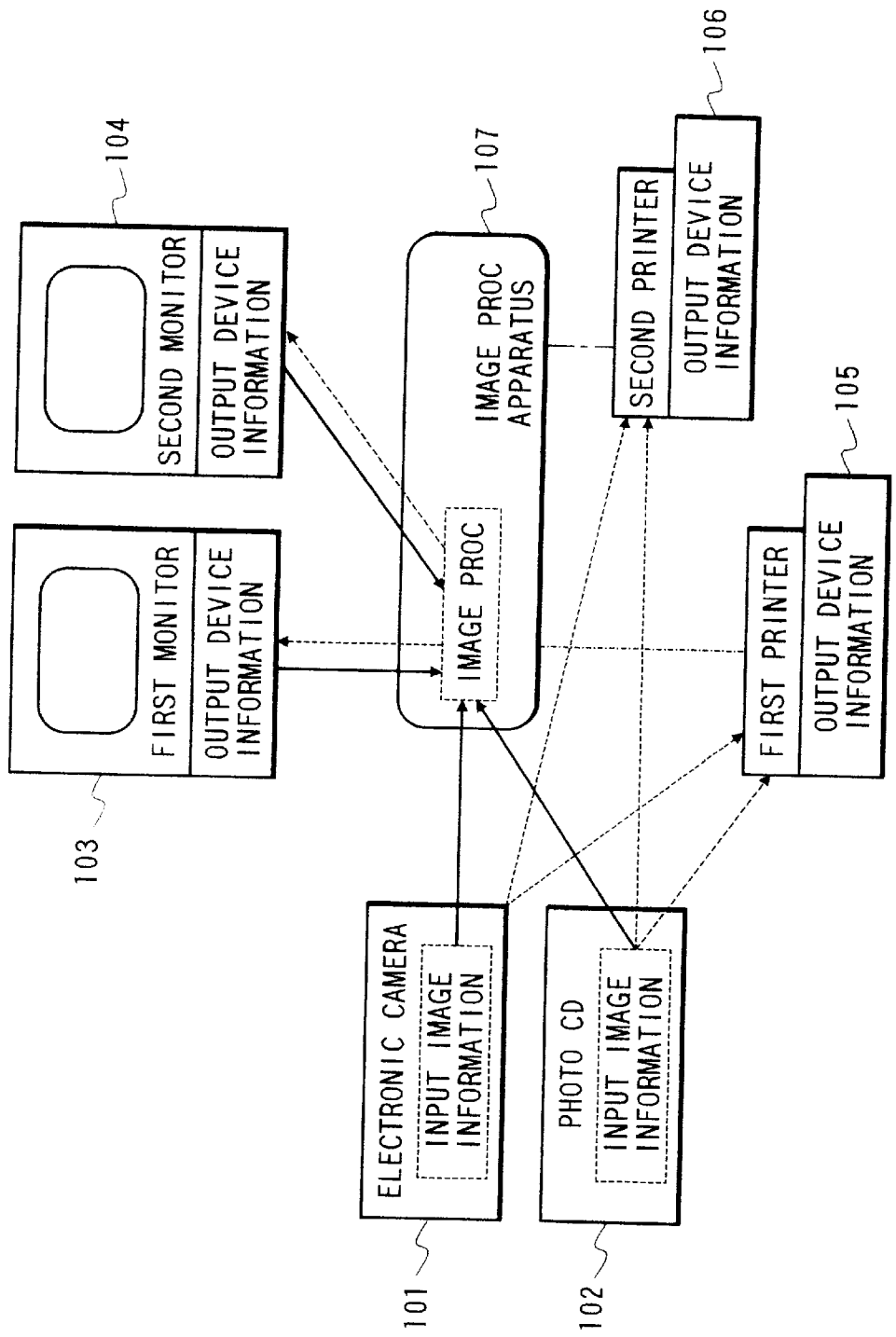
FIG. 10 is a block diagram showing the structure of an image processing system according to a third embodiment of the invention.

FIG. 10 is a diagram showing an image processing system according to the third embodiment of the invention. An image processing system shown in FIG. 10 is constituted of an electronic camera 101, a photo CD 102, a first monitor 103, a second monitor 104, a first printer 105, a second printer 106, and a computer 107.

The different points from the first embodiment reside in that each image input device 101, 102 adds input image information to image data and each output device stores output device information, and in that in the output device having a computation function such as the first and second printers 105 and 106, APC correction is performed not by the image processing apparatus 107 but by the output device.

Figure 11:
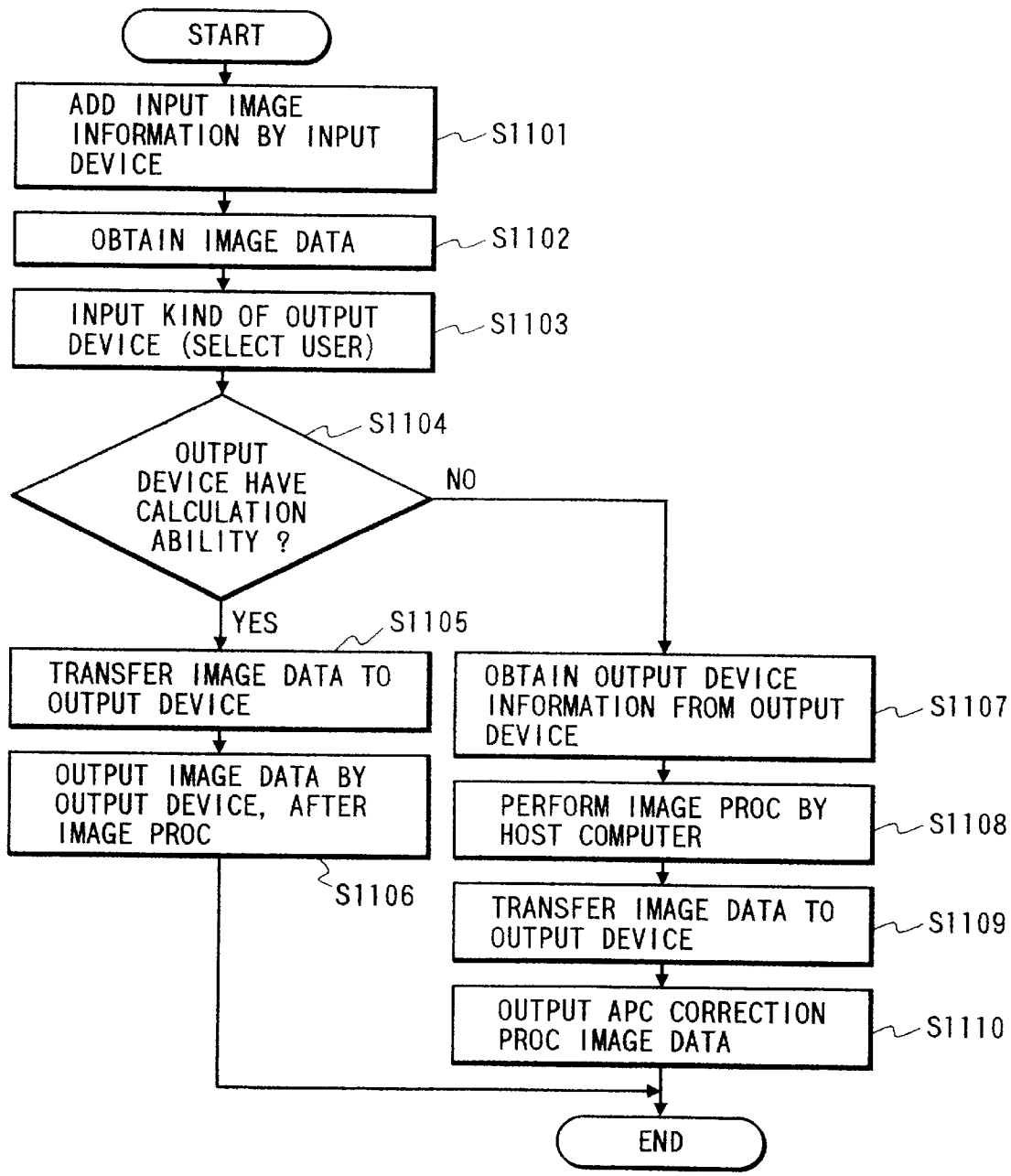
FIG. 11 is a flow chart illustrating an operation sequence of the image processing system of the third embodiment.

FIG. 11 is a flow chart illustrating sequential operations of the image processing system of the third embodiment. The operation of the image processing system of this embodiment will be described with reference to FIGS. 10 and 11.

First, the input device such as the electronic camera 101 adds input image information to image data (Step S1101). Next, at Step S1102, the image data with the input image information is sent to the image data processing apparatus 107. A user then enters the type of an output device (Step S1103).

The image processing apparatus 107 checks whether the output device designated by the user has a computation function (Step S1104). If the output device is a printer or the like having the computation function, at Step S1105 the input image information and image data are transferred to the output device. Upon reception of this, the output device performs APC correction by using the received image data and input image information and its own output device information, to output the APC corrected image (Step S1106).

If it is judged at Step S1104 that the output device is a monitor or the like and has no computation function, at Step S1107 the image processing apparatus fetches the output device information of the output device connected thereto. In accordance with the input image information and output device information, the image processing apparatus 107 performs APC correction (Step S1108), and transfers the APC corrected image data to the output device such as a monitor (Step S1109). The output device such as a monitor outputs the transferred APC corrected image (Step S1110).

With the above structure of this embodiment, image data is APC corrected by an output device in some cases by using the input image information and output device information so that a load on the image processing apparatus 107 can be reduced. If the output device having a computation function such as a printer is used, the image processing apparatus 107 executes only a data transfer process so that the operation can be made efficient.

The image processing apparatus 107 may store output device information of each output device and generate APC correction data in accordance with the input image information and output device information to add the APC correction data to the header of the image data and transfer it to the output device. In this case, it is not necessary for the output device to perform complicated calculations for obtaining APC correction data. Furthermore, since the header information is the calculated APC correction data, the amount of data to be transferred to the output device can be reduced. The output device information may be received from the output device via a communication line, or as in the first embodiment, it may be selected from a plurality of output device information sets prestored in the image processing apparatus 107.

(Another Embodiments)

The scope of the invention also includes a system or apparatus whose computer (CPU or MPU) runs to operate various devices connected thereto in accordance with software program codes supplied to the system or apparatus so as to realize the functions of the above embodiments.

In this case, the software program codes themselves realize the embodiment functions.

Therefore, the program code themselves and means for supplying such program codes to a computer, e.g., a storage medium storing such program codes, constitute the present invention.

The storage medium storing such program codes may be a floppy disk, a hard disk, an optical disk, a magnetooptical disk, a CD-ROM, a magnetic tape, a non-volatile memory card, and a ROM.

Obviously, such program codes are other types of embodiments of this invention, not only for the case wherein the embodiment functions are realized by executing the program codes supplied to the computer but also for the case wherein the embodiment functions are realized by the program codes used with an OS (operating system) on which the computer runs or with other various types of application software.

Furthermore, the scope of the invention also includes obviously the case wherein in accordance with the program codes stored in a memory of a function expansion board or unit connected to the computer supplied with the program codes, a CPU or the like of the function board or unit executes part or the whole of the actual tasks for realizing the embodiment functions.

The invention has been described in connection with the above preferred embodiments. The invention is not limited only to the above embodiments, but various modification are possible without departing from the scope of the appended claims.

What is claimed is:

1. An image processing apparatus comprising:

input means for inputting input image information of image data and output device information of an output device which outputs the image data; and image processing means for subjecting the image data to an aperture correction process in accordance with said input image information and said output device information, wherein said input image information includes at least the type of the image data, information of whether the image data has underwent the aperture correction process, and the type and parameter of the aperture correction process if the image data has underwent the process, and said image processing means executes the aperture correction process for the input image data by using the above-recited information.

2. An image processing apparatus comprising:

input means for inputting input image information of image data and output device information of an output device which outputs the image data; and image processing means for subjecting the image data to an aperture correction process in accordance with said input image information and said output device information.

wherein said image processing means executes a process of canceling the aperture correction process and executes another aperture correction process matching the characteristics of the output device which outputs the image data, if the input image data has underwent the aperture correction process.

3. An image processing apparatus comprising:

input means for inputting first aperture correction information corresponding to image data and second aperture correction information corresponding to an output device; and setting means for setting an aperture correction condition in accordance with said first and second aperture correction information.

4. An image processing apparatus according to claim 3, further comprising:

means for performing aperture correction for said image data in accordance with said set aperture correction condition.

5. An image processing apparatus according to claim 3, wherein said input means inputs said first aperture correction information from a header of said image data.

6. An image processing apparatus according to claim 4, further comprising:

means for communicating with said output device, wherein:

said input means inputs said second aperture correction information from said output device via said communication means; and said image data subjected to said aperture correction is transferred via said communication means to said output device.

7. An image processing apparatus according to claim 3, wherein said setting means sets said aperture correction condition in accordance with the type of said image data.

8. An image processing method comprising the steps of:

inputting first aperture correction information corresponding to image data and second aperture correction information corresponding to an output device; and setting an aperture correction condition in accordance with said first and second aperture correction information.

9. A storage medium for storing a program realizing an image processing method comprising the steps of:

inputting first aperture correction information corresponding to image data and second aperture correction information corresponding to an output device; and setting an aperture correction condition in accordance with said first and second aperture correction information.

* * * * *

UNITED STATES PATENT AND TRADEMARK OFFICE
CERTIFICATE OF CORRECTION

PATENT NO. : 5,963,271
DATED : October 5, 1999
INVENTOR(S) : EIICHIRO IKEDA

It is certified that error appears in the above-identified patent and that said Letters Patent is hereby corrected as shown below:

ON THE TITLE PAGE [73]

Assignee, "Canon Kabushkik Kaisha" should read --Canon Kabushiki Kaisha--.

COLUMN 3:

Line 39, "filer," should read --filter,--.

COLUMN 7:

Line 18, "(Another" should read --(Other--;
    Line 26, "code" should read --codes--; and
    Line 50, "modification" should read --modifications--.

COLUMN 8:

Line 11, "mation." should read --mation,--.

Signed and Sealed this

Eleventh Day of July, 2000

Attest:

Q. TODD DICKINSON

*Attesting Officer*    *Director of Patents and Trademarks*